United States Patent [19]

Viereck

[11] Patent Number: 5,025,492
[45] Date of Patent: Jun. 18, 1991

[54] DAMPING CIRCUIT FOR THE ANTENNA RESONANCE CIRCUIT OF A RADIO TRANSMITTER-RECEIVER

[75] Inventor: Bruno Viereck, Marzling, Fed. Rep. of Germany

[73] Assignee: Texas Instruments Deutschland GmbH, Dallas, Tex.

[21] Appl. No.: 507,683

[22] Filed: Apr. 11, 1990

[51] Int. Cl.⁵ .................. G01S 13/74; G08B 13/184
[52] U.S. Cl. ................................ 342/144; 340/572; 340/825.54
[58] Field of Search ............... 342/44; 340/572, 573, 340/825.54

[56] References Cited

U.S. PATENT DOCUMENTS

| | | | |
|---|---|---|---|
| 3,740,742 | 6/1973 | Thompson et al. | 340/572 |
| 4,087,791 | 5/1978 | Lemberger | 340/825.54 |
| 4,510,495 | 4/1985 | Sigrimis et al. | 342/44 X |
| 4,752,776 | 6/1988 | Katzenstein | 340/825.54 |

*Primary Examiner*—Gilberto Barrón, Jr.
*Attorney, Agent, or Firm*—Mel Sharp; N. Rhys Merrett; James T. Comfort

[57] ABSTRACT

A damping circuit is described for the antenna resonance circuit (28) of a radio transmitter-receiver (10) which in a transmitting phase transmits a time-limited high-energy interrogation pulse and in a receiving phase following the transmitting phase is ready to receive high-frequency response signals coming from a responder (26) which transmits said response signals as reaction to the reception of the interrogation pulse. In the damping circuit (24) a damping member (R5, R5, R6) is provided which is adapted to be connected to the antenna resonance circuit and disconnected therefrom. A switching means (T4, T5) on receiving a switching voltage applies the damping member (R4, R5, R6) to the antenna resonance circuit (28). A first energy-storage element (C1) chargeable by the HF interrogation pulse serves for furnishing the switching voltage and a second energy-storage element chargeable by the HF interrogation pulse in dependence upon the time profile of the HF interrogation pulse enables the application of the switching voltage present at the first energy-storage element to the switching means (T4, T5).

4 Claims, 1 Drawing Sheet

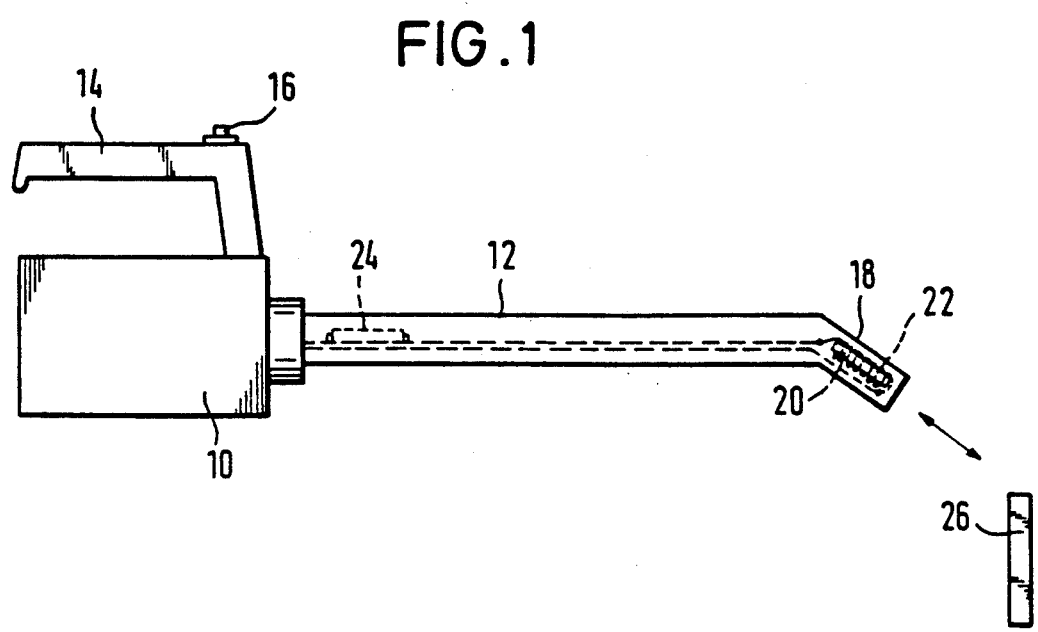
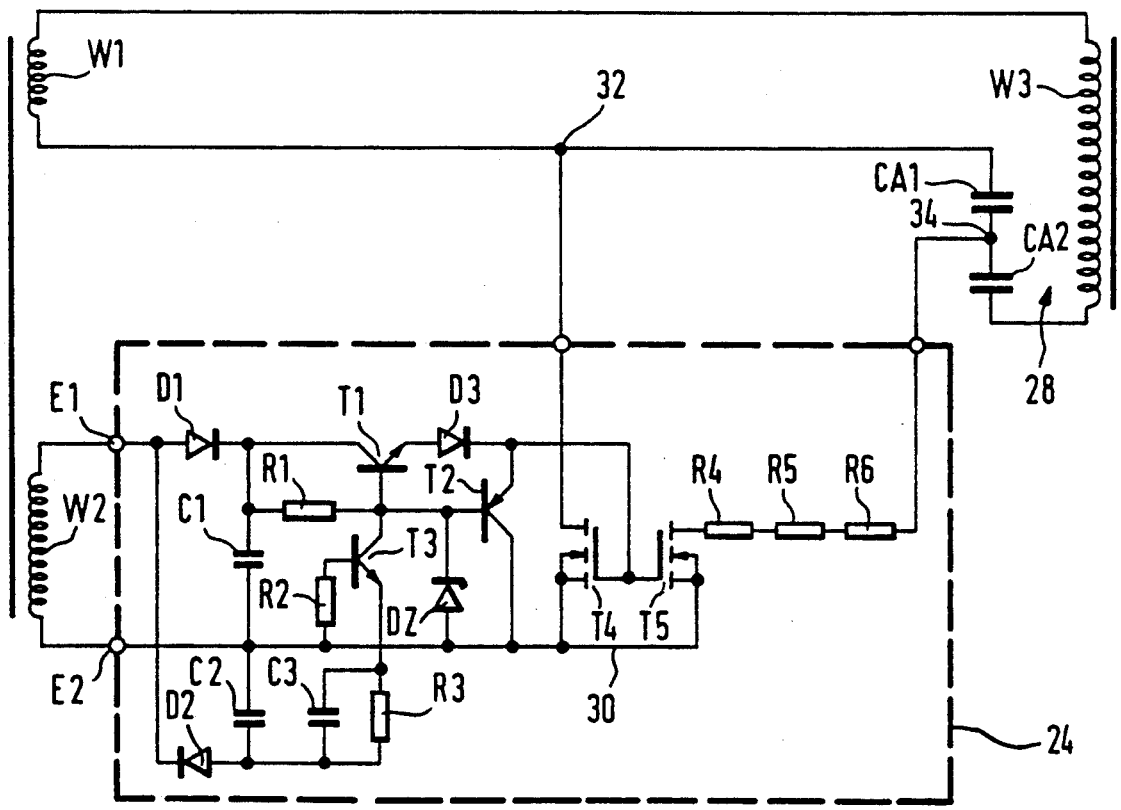

DAMPING CIRCUIT FOR THE ANTENNA RESONANCE CIRCUIT OF A RADIO TRANSMITTER-RECEIVER

The invention relates to a damping circuit for the antenna resonance circuit of a radio transmitter-receiver which in a transmitting phase transmits a time-limited energy-rich HF interrogation pulse and in a receiving phase following the transmitting phase is ready to receive high-frequency response signals coming from a responder which transmits said response signals as a reaction to the reception of the interrogation pulse.

GB-A-2,077,555 discloses a transponder system in which a radio transmitter-receiver acting as interrogator cooperates with one or more responders. The cooperation is carried out in that the radio transmitter-receiver transmits a high-energy HF interrogation pulse which is received by a responder located within the range of the transmitting antenna, said responder thereby being activated to send back a signal which contains a code clearly identifying the transmitting responder. How the code is formed in detail is of no consequence in the present case. The peculiarity of the responder resides in that it does not contain its own energy source but draws its energy from the received HF interrogation pulse by rectification and storing. To enable the radio transmitter-receiver to transmit an HF interrogation pulse containing as much energy as possible the antenna resonance circuit must be as far as possible a resonance circuit with high quality which then also has a correspondingly narrow band. Since as mentioned the responder does not contain its own energy source but draws its energy from the received HF interrogation pulse, the sending back of the response signal must take place as quickly as possible because for this responding operation relatively little energy is available. To enable a large number of different responders to be distinguished by their own code a predetermined number of data bits is necessary for the code and these must be sent back to the radio transmitter-receiver. The higher the number of data bits the higher the repetition frequency of the individual data bits. This high repetition frequency requires however on the receiver side of the radio transmitter-receiver an antenna resonance circuit with as broad a band as possible. In the known transponder system these contradictory requirements of the antenna resonance circuit are overcome in that a separate antenna is employed for the transmission and a separate antenna for the reception each having corresponding antenna resonance circuits. However, in order to simplify the radio transmitter-receiver it would be desirable to use one and the same antenna with a single antenna resonance circuit for transmission and for reception.

The invention is based on the problem of providing a damping circuit for the antenna resonance circuit of a radio transmitter-receiver which makes it possible to use a single antenna for the transmission of a high-energy HF pulse and the reception of HF signals.

According to the invention this problem is solved by a damping member adapted to be connected to the antenna resonance circuit and separated therefrom, a switching means which on reception of a switching voltage connects the damping member to the antenna resonance circuit, a first energy-storage element chargeable by the HF interrogation pulse for furnishing the switching voltage and a second energy-storage element which is chargeable by the HF interrogation pulse and which in dependence upon the time profile of the HF interrogation pulse enables the application of the switching voltage present at the first energy-storage element to the switching means.

The damping circuit according to the invention permits switchover of the quality of the antenna resonance circuit, said switchover taking place automatically in dependence upon the profile of the HF interrogation pulse in the sense that the antenna resonance circuit has the necessary high quality during the presence of the HF interrogation pulse so that accordingly a high-energy HF interrogation pulse can also be transmitted whilst on termination of said pulse switchover to a low quality takes place automatically by connecting the damping member to the antenna resonance circuit so that the wide band of the antenna resonance circuit necessary for reception is achieved. This switchover has a further advantageous effect due to the fact that the radio transmitter-receiver after termination of the HF interrogation pulse moves very rapidly into the ready-to-receive state because due to the connection of the damping member the decay of the oscillation of the antenna resonance circuit takes place at high speed so that the reception of an HF signal possibly transmitted by a responder is possible immediately after termination of the HF interrogation pulse. This is a particularly great advantage when the responder does not contain its own energy source but must operate with the energy drawn from the HF interrogation pulse and stored in a capacitor. Since the storing of this energy is of course limited the responder must send its HF signal back as quickly as possible after termination of the HF interrogation pulse in order to make optimum use of the stored energy.

Advantageous further developments of the invention are characterized in the subsidiary claims:

The invention will now be explained by way of example with the aid of the drawings, wherein:

FIG. 1 is a fundamental diagram of a radio transmitter-receiver which cooperates with responders and in which the damping or attenuation circuit according to the invention is used, and FIG. 2 is a circuit diagram of the antenna resonance circuit with the damping circuit according to the invention.

The transponder system illustrated in FIG. 1 includes a radio transmitter-receiver 10 at the front side of which a rod-like antenna 12 is disposed. The radio transmitter-receiver 10 comprises a grip 14 on which an activating switch 16 is disposed. On each actuation of the activating switch 16 a transmitter section is activated and as a result a high-energy HF interrogation pulse is transmitted by means of the antenna 12. As indicated schematically, in the tip 18 of the antenna 12 a ferrite rod 20 is incorporated which is surrounded by an antenna winding 22. Furthermore, a damping circuit 24 indicated schematically in FIG. 1 is accommodated in the antenna 12.

The radio transmitter-receiver 10 illustrated in FIG. 1 cooperates with a responder 26 which is shown only schematically. Said responder may be attached to an object to be identified or built into an object to be identified. For example, the responder 26 could also be attached to the earmark of a cow making it possible to identify the cow by interrogation of the responder attached thereto. The responder could also if necessary be implanted in the skin of an animal. Although in FIG. 1 only one responder 26 is shown in a real application case a great number of responders may be present which can each be interrogated in that the antenna 12 of the radio transmitter-receiver 10 is moved into the vicinity of the respective responder 26 and the interrogation pulse is transmitted by actuating the activating switch 16.

In FIG. 2 the electrical circuit diagram of the antenna resonance circuit 28 and the damping circuit 24 connected thereto are illustrated. The antenna resonance circuit 28 is coupled by means of a winding W1 to a winding, not illustrated, in the transmitter-receiver 10. The winding W3 of the antenna resonance circuit 28 is wound round the ferrite rod 20. The winding W1, the winding W3 and two capacitors CA1 and CA2 are connected in series in the antenna resonance circuit 28.

The damping circuit 24 comprises two inputs E1 and E2 to which a winding W2 is connected which like the winding W1 is coupled to a winding in the radio transmitter-receiver 10. Connected to the input E1 is the anode of a diode D1, the cathode of which is connected to the collector of a transistor T1. Between the collector of the transistor T1 and its base there is a resistor R1. The cathode of the diode D1 is also connected to a capacitor C1 which is connected at the input E2. The potential present at the input E2 is taken as ground potential in the damping circuit 24. The line 30 connected to the input E2 is therefore referred to as ground line.

The base of the transistor T1 is connected to the collector of a transistor T3 of which the base is connected via a resistor R2 to the ground line 30. Furthermore, to the base of the transistor T1 the cathode of a Zener diode DZ is connected, the anode of which is connected to the ground line 30. The emitter of the transistor T1 is connected to the anode of a further diode D3 the cathode of which is connected to the emitter of a transistor T2 of which the collector is connected to the ground line 30. The base of the transistor T2 is in connection with the base of the transistor T1 and with the collector of the transistor T3. Furthermore, the cathode of the diode D3 leads to the gate electrodes of two field-effect transistors T4 and T5 which are MOS field-effect transistors of the enhancement type. The drain electrode of the field-effect transistor T4 is connected to the connecting line between the winding W1 and the capacitor CA1 of the antenna resonance circuit 28 whilst its source electrode is connected to the ground line 30. The drain electrode of the field-effect transistor T5 is connected via a series circuit of three resistors R4, R5 and R6 to the connecting point of the two capacitors CA1 and CA2; it source electrode is connected to the ground line 30. Also connected to the input E1 is the cathode of a diode D2 of which the anode is connected via a capacitor C2 to the ground line 30 and via a parallel circuit of a capacitor C3 and a resistor R3 to the emitter of the transistor T3. The series circuit of the three resistors can of course be replaced by a single resistor.

The damping circuit of which the construction has been described operates as follows:

If all the capacitors in the damping circuit 24 are discharged and the transmitter section of the radio transmitter-receiver 10 is deactivated, the damPing circuit 24 is not active. In this state the series circuit of the resistors R4, R5 and R6 acting as damping member is not connected in parallel to the capacitor CA1 and consequently the antenna resonance circuit is not damped by said damping member. The antenna resonance circuit therefore has a high circuit quality so that on corresponding energy supply to the winding W1 by means of the winding W3 it can generate a strong magnetic field with small harmonic content.

When the acticing switch 16 is actuated an AC voltage is induced in the winding W2 and is applied via the inputs E1 and E2 to the damping circuit 24. Due to the effect of the diode D1 the voltage at the input E1 generates a positive voltage at the capacitor C1 whilst the diode D2 generates a negative voltage at the capacitor C2. At the start of the HF interrogation pulse at the capacitor C2 a voltage jump occurs and as a result via the capacitor C3 a negative potential is applied to the emitter of the transistor T3 so that the collector of the transistor T3 takes on the current flowing through the resistor R1. At the same time, a voltage lying close to ground potential is thereby applied to the base of the transistor T2 so that the emitter of the transistor T2 keeps the gate electrodes of the two field-effect transistors T4 and T5 with low resistance almost at ground potential. This low-resistance state of the field-effect transistors T4 and T5 prevents said enhancement field-effect transistors rendering themselves conductive due to the high AC voltage at their drain terminals via their drain/gate capacitances, thus leading to a damping of the antenna resonance circuit by connection of the resistors R4, R5, R6 in parallel with the capacitor CA1.

During the reception of the HF interrogation pulse the Zener diode DZ is forward conducting and together with the resistor R2 prevents excessive saturation of the transistor T3. Excessive saturation of said transistor T3 is to be avoided because said transistor after termination of the HF interrogation pulse must react as quickly as possible and this could not be achieved with excessive saturation. Moreover, the Zener diode DZ prevents the voltage exceeding or dropping below the maximum admissible gate voltage at the field-effect transistors T4 and T5.

The diode D3 ensures that the transistor T1 is not conductive during the reception of the HF interrogation pulse.

After the capacitor C3 has been charged to its end voltage the resistor R3 furnishes enough current to the emitter of the transistor T3 to prevent the damping action from occurring because the transistor T1 remains nonconductive.

As soon as the capacitor C1 has been charged to its end voltage the requirements are present for a rapid damping of the antenna resonance circuit and the resultant switchover of the quality from a high value to a low value after termination of the HF interrogation pulse.

Although as soon as the HF interrogation pulse ends the voltage in the antenna resonance circuit rises for a few more periods, the resonance circuit current then drops due to the inherent damping of the antenna resonance circuit so that the negative charge voltage at the capacitor C2 also begins to drop. This manifests itself via the capacitor C3 as positive voltage jump at the emitter of the transistor T3.

The capacitors C1 and C2 and the resistors R1 and R3 are so dimensioned that the time constant C1/R1 is greater than the time constant C2/R3. As a result, in contrast to the voltage at the capacitor C2 the voltage at the capacitor C1 remains substantially constant over the period of time considered. Due to the already described positive voltage jump at the emitter of the transistor T3 the transistor T1 becomes conductive. At its emitter the voltage therefore rises and passes via the diode D3 to the gate electrodes of the field-effect transistors T4 and T5. As soon as the threshold voltage of these field-effect transistors T4, T5 is exceeded the damping member formed from the series circuit of the resistors R4, R5 and R6 connects itself in parallel with the capacitor CA1 which is a partial capacitance of the antenna resonance circuit 28.

The damping member could however also be connected to the antenna resonance circuit via an inductive tap, connection to the entire antenna resonance circuit would also be possible. The reason for connecting the damping member in via an inductive or also capacitive tap is that at the maximum resonance circuit voltage occurring the maximum admissible drain/gate voltage of the field-effect transistor T4, T5 must not be exceeded. Moreover, the connecting of the damping member in at such a tap can be expedient if the damping resistance together with the parasitic capacitances, in particular taking account of the not inconsiderable capacitances of the nonconductive field-effect transistors T4 and T5, form an RC member having a limit frequency in the vicinity of or beneath the operating frequency of the overall system.

The charging or recharging of the capacitances of the field-effect transistors T4 and T5 withdraws from the capacitor C1, serving as energy store, a considerable proportion of its energy. The greatest part of the energy is used by the drain/gate capacitance and the high AC voltage during the switching-on phase of the field-effect transistors T4, T5. Thereafter, account need only be taken of leakage currents in the circuit so that with components having small leakage currents the damping phase in which the damping member comprising the resistors R4, R5 and R6 is active can be several times the necessary receiving time.

Inherent to the design, the field-effect transistors T4 and T5 comprise internally between the drain electrode and the source electrode an "inverse diode" and as a result for operation with AC voltage two field-effect transistors are required for the disconnection, of which depending on the polarity of the voltage one is always conductive via its internal diode. For the winding W2 this means that it is applied in time with the AC voltage via one of said "inverse diodes" alternately to the circuit points 32 and 34 of the resonance circuit. Consequently, the winding W2 must be well insulated with respect to the winding W1 to avoid breakdowns occurring at the peak values of the resonance circuit voltage.

As soon as a new HF interrogation pulse is transmitted due to the function cycle described above the damping member comprising the resistors R4, R5 and R6 is again separated from the antenna resonance circuit 28 so that the antenna resonance circuit 28 can again emit the magnetic field with high circuit quality as is necessary for the response of a responder 26.

The antenna damping circuit described thus operates completely automatically in dependence upon the occurrence of an HF interrogation pulse; it does not require its own current supply source but derives the energy necessary for its operation from the HF interrogation pulse. The damping of the antenna resonance circuit 28 achieved after completion of the HF interrogation pulse by employing the damping circuit 24 not only effects the changeover of the quality of the antenna resonance circuit 28 but also makes said circuit and thus the radio transmitter-receiver 10 ready-to-receive the signals returned by the responder 26 immediately after termination of the HF interrogation pulse.

I claim:

1. Damping circuit for the antenna resonance circuit of a radio transmitter-receiver which in a transmitting phase transmits a time-limited energy-rich HF interrogation pulse and in a receiving phase following the transmitting phase is ready to receive high-frequency response signals coming from a responder which transmits said response signals as a reaction to the reception of the interrogation pulse, including a damping member adapted to be connected to the antenna resonance circuit and separated therefrom, a switching means which on reception of a switching voltage connects the damping member to the antenna resonance circuit, a first energy-storage element chargeable by the HF interrogation pulse for furnishing the switching voltage and a second energy-storage element which is chargeable by the HF interrogation pulse and which in dependence upon the time profile of the HF interrogation pulse enables the application of the switching voltage present at the first energy-storage element to the switching means.

2. Damping circuit according to claim 1, the antenna resonance circuit containing as capacitance a series circuit of two capacitors, wherein the damping member can be connected by the switching means in parallel with one of the capacitors of the antenna resonance circuit.

3. Damping circuit according to claim 1, wherein the damping member is coupled via an inductive tap to the antenna resonance circuit.

4. Damping circuit according to claim 1, wherein the switching means comprises two field-effect transistors, the gate electrodes of which are connected together and the drain-source paths of which are connected in series with the damping member.

* * * * *